US007850280B2

(12) United States Patent
Oyanagi et al.

(10) Patent No.: US 7,850,280 B2
(45) Date of Patent: Dec. 14, 2010

(54) LIGHT IRRADIATING APPARATUS, LIGHT IRRADIATING PROCESS, AND IMAGE RECORDING PROCESS

(75) Inventors: Takashi Oyanagi, Nagano (JP); Keitaro Nakano, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 664 days.

(21) Appl. No.: 11/483,394

(22) Filed: Jul. 7, 2006

(65) Prior Publication Data

US 2008/0182030 A1 Jul. 31, 2008

(30) Foreign Application Priority Data

Jul. 8, 2005 (JP) .......................... P.2005-200301
Mar. 3, 2006 (JP) .......................... P.2006-058695

(51) Int. Cl.

*B41J 2/015* (2006.01)
*B41J 2/15* (2006.01)
*B41J 2/155* (2006.01)
*B41J 2/14* (2006.01)
*C08J 7/04* (2006.01)

(52) U.S. Cl. ............................ 347/51; 347/20; 347/40; 347/42; 427/511

(58) Field of Classification Search ................. 347/102; 427/466, 508

See application file for complete search history.

(56) References Cited

U.S. PATENT DOCUMENTS

| | | | | |
|---|---|---|---|---|
| 5,623,001 | A | 4/1997 | Figov | |
| 6,554,414 | B2 * | 4/2003 | Ylitalo et al. | 347/102 |
| 6,910,764 | B2 * | 6/2005 | Nakajima | 347/102 |
| 2004/0080598 | A1 * | 4/2004 | Hasebe et al. | 347/102 |
| 2004/0169718 | A1 * | 9/2004 | Yaji | 347/251 |
| 2005/0080152 | A1 * | 4/2005 | Bergiers et al. | 522/71 |

FOREIGN PATENT DOCUMENTS

| | | |
|---|---|---|
| JP | 3-216379 | 9/1991 |
| JP | 5-186725 | 7/1993 |
| JP | 5-54667 | 8/1993 |
| JP | 6-200204 | 7/1994 |
| JP | 7-224241 | 8/1995 |
| JP | 8-48922 | 2/1996 |
| JP | 8-218016 | 8/1996 |
| JP | 10-7956 | 1/1998 |

(Continued)

OTHER PUBLICATIONS

Computer-Generated English Translation of Specification and Claims and Patent Abstracts of Japan of 2004-167793 dated Jun. 17, 2004.

(Continued)

*Primary Examiner*—Matthew Luu
*Assistant Examiner*—Kendrick X Liu
(74) *Attorney, Agent, or Firm*—Ladas & Parry LLP

(57) ABSTRACT

The present invention provides a light irradiating apparatus comprising a plurality of light emitting elements which emit light of a specific wavelength region and form elliptical light images on a surface to be irradiated, wherein the plurality of light emitting elements are mutually arranged so that the light images are made continuous along their major axis directions. Further, the invention also discloses the above-mentioned light irradiating process and an image recording process.

18 Claims, 4 Drawing Sheets

FOREIGN PATENT DOCUMENTS

| | | |
|---|---|---|
| JP | 10-250052 | 9/1998 |
| JP | 10-324836 | 12/1998 |
| JP | 2000-44857 | 2/2000 |
| JP | 2000-119574 | 4/2000 |
| JP | 2000-504778 | 4/2000 |
| JP | 2000-158793 | 6/2000 |
| JP | 2000-186242 | 7/2000 |
| JP | 2000-186243 | 7/2000 |
| JP | 2000-336295 | 12/2000 |
| JP | 2001-220526 | 8/2001 |
| JP | 2001-512777 | 8/2001 |
| JP | 2002-80767 | 3/2002 |
| JP | 2003-191593 | 7/2003 |
| JP | 2003-191594 | 7/2003 |
| JP | 2003-313476 | 11/2003 |
| JP | 2003-326691 | 11/2003 |
| JP | 2004-1326 | 1/2004 |
| JP | 2004-27154 | 1/2004 |
| JP | 2004-167793 | 6/2004 |
| WO | 97/31071 | 8/1997 |
| WO | 99/07796 | 2/1999 |

OTHER PUBLICATIONS

Computer-Generated English Translation of Specification and Claims and Patent Abstracts of Japan of 2004-27154 dated Jan. 29, 2004.
Computer-Generated English Translation of Specification and Claims and Patent Abstracts of Japan of 2004-1326 dated Jan. 8, 2004.
Computer-Generated English Translation of Specification and Claims and Patent Abstracts of Japan of 2003-326691 dated Nov. 19, 2003.
Computer-Generated English Translation of Specification and Claims and Patent Abstracts of Japan of 2003-313476 dated Nov. 6, 2003.
Computer-Generated English Translation of Specification and Claims and Patent Abstracts of Japan of 2003-191594 dated Jul. 9, 2003.
Computer-Generated English Translation of Specification and Claims and Patent Abstracts of Japan of 2003-191593 dated Jul. 9, 2003.
Computer-Generated English Translation of Specification and Claims and Patent Abstracts of Japan of 2002-80767 dated Mar. 19, 2002.
English Abstract of JP 2001-512777 dated Aug. 28, 2001.
Computer-Generated English Translation of Specification and Claims and Patent Abstracts of Japan of 2001-220526 dated Aug. 14, 2001.
Computer-Generated English Translation of Specification and Claims and Patent Abstracts of Japan of 2000-336295 dated Dec. 5, 2000.
Computer-Generated English Translation of Specification and Claims and Patent Abstracts of Japan of 2000-186243 dated Jul. 4, 2000.
Computer-Generated English Translation of Specification and Claims and Patent Abstracts of Japan of 2000-186242 dated Jul. 4, 2000.
Computer-Generated English Translation of Specification and Claims and Patent Abstracts of Japan of 2000-158793 dated Jun. 13, 2000.
Computer-Generated English Translation of Specification and Claims and Patent Abstracts of Japan of 2000-119574 dated Apr. 25, 2000.
Computer-Generated English Translation of Specification and Claims and Patent Abstracts of Japan of 2000-44857 dated Feb. 15, 2000.
Computer-Generated English Translation of Specification and Claims and Patent Abstracts of Japan of 10-324836 Dec. 8, 1998.
Computer-Generated English Translation of Specification and Claims and Patent Abstracts of Japan of 10-250052 dated Sep. 22, 1998.
Computer-Generated English Translation of Specification and Claims and Patent Abstracts of Japan of 10-7956 dated Jan. 13, 1998.
Computer-Generated English Translation of Specification and Claims and Patent Abstracts of Japan of 8-218016 dated Aug. 27, 1996.
Computer-Generated English Translation of Specification and Claims and Patent Abstracts of Japan of 8-48922 dated Feb. 20, 1996.
Computer-Generated English Translation of Specification and Claims and Patent Abstracts of Japan of 7-224241 dated Aug. 22, 1995.
Computer-Generated English Translation of Specification and Claims and Patent Abstracts of Japan of 6-200204 dated Jul. 19, 1994.
Computer-Generated English Translation of Specification and Claims and Patent Abstracts of Japan of 5-186725 dated Jul. 27, 1993.
Patent Abstracts of Japan of 3-216379 dated Sep. 24, 1991.
Patent Abstracts of Japan of 60-119554 dated Jun. 27, 1985.

* cited by examiner

LIGHT IRRADIATING APPARATUS, LIGHT IRRADIATING PROCESS, AND IMAGE RECORDING PROCESS

FIELD OF THE INVENTION

The present invention relates to a light irradiating apparatus for irradiating light having a specific wavelength region on a surface to be irradiated, a light irradiating process and an image recording process, and more particularly to a light irradiating apparatus suitable for using when a light curing type ink adhered onto a recording medium with an ink jet printer or the like is cured by light irradiation, a light irradiating process and an image recording process.

BACKGROUND OF THE INVENTION

In recent years, attention has been drawn to ultraviolet curing type inks as inks used in ink jet printers and the like.

The point at which the ultraviolet curing type inks are different from ordinary water-based and oil-based inks is that the ultraviolet curing type inks are quickly cured when adhered onto recording media (for example, print paper and the like), and then, irradiated with a proper amount of a ultraviolet ray, thereby being able to maintain stable printing quality, without depending on physical properties of the recording media such as ink permeability.

In the ink jet printer using such an ultraviolet curing type ink, it is necessary to provide an ultraviolet irradiating apparatus for irradiating an ultraviolet ray on an ink adhered onto the recording medium, on the periphery of a recording head for ejecting the ultraviolet curing type ink as fine-particle ink droplets to adhere them onto the recording medium.

In the conventional ultraviolet irradiating apparatus, there has been variously proposed one in which an ultraviolet lamp such as a mercury lamp or a metal halide lamp is employed as a light source for emitting an ultraviolet ray (for example, see Patent Document 1).

However, light emitted from the ultraviolet lamp has a continuous spectrum over a wide wavelength region and includes visible light and infrared light in addition to a plurality of ultraviolet lights having different wavelength regions, so that there has been a problem that the infrared light in the continuous spectrum gives a thermal damage to the recording medium.

When a band-pass filter is provided in order to remove the hazardous infrared light, there has been a problem that the structure of a device becomes complicated, resulting in an increase in cost.

Further, the ultraviolet lamp has great power consumption, so that there has been a problem that energy saving of the ultraviolet irradiating apparatus is difficult.

In addition, the ultraviolet lamp itself is large, so that there has also been a problem that miniaturization and weight saving of the apparatus is difficult.

Consequently, associated with development of a solid laser or a light emitting diode (LED) which includes no infrared light, is capable of emitting only light of a specific wavelength region and has relatively small power consumption, there has recently been studied an ultraviolet irradiating apparatus in which these are employed as a light source, thereby preventing a thermal damage from being given to the recording medium caused by the infrared light contained, while achieving energy saving, miniaturization and weight saving (for example, see Patent Document 2).

Further, when printed images of the ultraviolet curing type inks are irradiated with these light source, there has been used a scanning system by a combination of a polygon mirror and an f-θ lens or a galvano mirror (for example, see patent document 3). However, these optical scanning systems have movable parts. This makes it difficult to further miniaturize the apparatus, and further, a decrease in reliability caused by malfunction is unavoidable.

For this reason, a light irradiating apparatus which can be further miniaturized, moreover, has no movable parts and can perform high-reliability face irradiation. As the light irradiating apparatus requiring no movable parts like this, there is considered, for example, a structure in which small-sized light sources are densely arranged.

[Patent Document 1] JP-A-2004-1326

[Patent Document 2] JP-A-2003-326691

[Patent Document 3] JP-A-2004-167793

However, there has been a problem that the structure of densely arranging small-sized light sources increases the number of light sources themselves, raises cost, and causes heat generated from the light sources to be accumulated between the light sources, also resulting in a decrease in life of the light sources due to their thermal damage and necessity of a cooling operation and means.

SUMMARY OF THE INVENTION

Accordingly, objects of the invention is to solve the above-mentioned problems, and to provide a light irradiating apparatus in which the number of light sources themselves is small, and which does not deteriorate due to damage by heat generated therefrom, a light irradiating process and an image recording process.

The above-mentioned objects are achieved by the following constitution:

(1) A light irradiating apparatus comprising a plurality of light emitting elements which emit light of a specific wavelength region and form elliptical light images on a surface to be irradiated, wherein the above-mentioned plurality of light emitting elements are mutually arranged so that the above-mentioned light images are made continuous along their major axis directions;

(2) The light irradiating apparatus described in the above (1), wherein the above-mentioned plurality of light emitting elements are arranged in a line or in a plurality of parallel lines;

(3) The light irradiating apparatus described in the above (1) or (2), wherein the above-mentioned plurality of light emitting elements comprise a single species or a combination of plural species of light emitting elements which emit an ultraviolet ray or visible light;

(4) The light irradiating apparatus described in any one of the above (1) to (3), wherein an arrangement of the above-mentioned plurality of light emitting elements is formed by arranging light emitting elements having the same light emitting wavelength peak or light emitting elements different in the light emitting wavelength peak, with spacing from one another along major axis directions of the elliptical light images;

(5) The light irradiating apparatus described in any one of the above (1) to (4), wherein the aspect ratio of the above-mentioned light image is 2.0 or more;

(6) The light irradiating apparatus described in any one of the above (1) to (5), wherein the above-mentioned light emitting element is a semiconductor laser element;

(7) The light irradiating apparatus described in the above (6), wherein the above-mentioned semiconductor laser element is one which emits an ultraviolet ray having a wavelength of less than 400 nm;

(8) The light irradiating apparatus described in the above (6), wherein the above-mentioned semiconductor laser element is one which emits visible light having a wavelength of 400 to 450 nm;

(9) The light irradiating apparatus described in the above (6), wherein the above-mentioned semiconductor laser element is a combination of one which emits an ultraviolet ray having a wavelength of less than 400 nm and one which emits visible light having a wavelength of 400 to 450 nm;

(10) A light irradiating process comprising irradiating light by using a plurality of light emitting elements which emit light of a specific wavelength region and form elliptical light images on a surface to be irradiated, wherein the above-mentioned light images are made continuous along their major axis directions;

(11) The light irradiating process described in the above (10), wherein the above-mentioned light emitting element is allowed to achieve continuous light emission;

(12) The light irradiating process described in the above (10), wherein the above-mentioned light emitting element is allowed to achieve pulse light emission;

(13) An image recording process comprising adhering a light curing type ink composition onto a recording medium, and then, performing light irradiation by the light irradiating apparatus described in any one of the above (1) to (9);

(14) An image recording process comprising adhering a light curing type ink composition onto a recording medium, and then, performing light irradiation by the light irradiating process described in any one of the above (10) to (12); and

(15) The image recording process described in the above (13) or (14), wherein the light curing type ink composition is one which contains at least a polymerizable compound, a photopolymerization initiator and a polymerization accelerator, and contains an N-vinyl compound as the polymerizable compound, two or more selected from the group consisting of a bisacylphosphine oxide, a monoacylphosphine oxide and an α-aminoketone as the photopolymerization initiator, and polymerizable functional group-containing fine particles as the polymerization accelerator, respectively.

In the light irradiating apparatus described in the above (1), the light emitting elements are arranged with spacing from one another in the major axis direction of the light images so that the elliptical light images formed by the respective light emitting elements are made continuous along the major axis direction of the ellipsoids. Accordingly, the light irradiating process described in the above (10) can be performed. Compared to the case of a light irradiating apparatus in which the light emitting elements are mutually arranged so that the elliptical light images are made continuous along the minor axis direction of the ellipsoids, a space between light emitting elements adjacent to one another can be set large, and it becomes possible to irradiate light of a specific wavelength region over the larger width by the smaller number of light emitting elements used.

Accordingly, when light of a specific wavelength region is irradiated over a predetermined width of a surface to be irradiated, it becomes possible to reduce the number of light emitting elements used as light sources to lower cost.

Further, the space distance between light emitting elements as light sources can be set large, so that heat generated from the respective light emitting elements becomes difficult to be accumulated between the light emitting elements, which can prevent the light emitting elements themselves from suffering from thermal damage due to the accumulated heat, thereby being able to prevent a decrease in life of the light sources due to their thermal damage.

Furthermore, for example, when mounted on the periphery of a print head of an ink jet printer to cure by light irradiation the light curing type ink adhered onto the recording medium by means of the print head of the printer, heat generation of the light irradiating apparatus itself can be inhibited. Accordingly, it becomes unnecessary to install a cooling operation and means such as a cooling fun on the printer, which also largely contributes to miniaturization of the ink jet printer and cost reduction.

In addition, the irradiating area of light according to the arrangement of the light emitting elements as the light sources can be set to an arbitrary size without being restricted by the major axis size x and the minor axis size y of the elliptical light image formed by the single light emitting element, by arranging the light emitting elements in a line or in a plurality of parallel lines as described in the above (2).

That is to say, the size of the irradiating area along the width direction of the recording medium can be arbitrarily set by appropriately setting the number of light emitting elements arranged in s line along the width direction of the recording medium, the size of the irradiating area along the transfer direction of the recording medium can be arbitrarily set by installing the element lines in the transfer direction of the recording medium in multiple lines at predetermined intervals, and the speeding up of processing can be achieved by increasing the number of light emitting element lines to enlarge the irradiating area of light in the transfer direction of the recording medium.

Further, the light curing type ink can allow the curing action to effectively proceed by the irradiation of an ultraviolet ray having a specific wavelength. However, even when visible light close to the ultraviolet ray is irradiated in place of the ultraviolet ray, curing processing is possible although the processing efficiency decreases, compared to the case of the ultraviolet irradiation.

In general, a light emitting element which emits an ultraviolet ray is more expensive than a light emitting element which emits visible light.

Consequently, taking into account the difference in price between the light emitting element for an ultraviolet ray and the light emitting element for visible light, the processing speed required and the like, the adoption of the light emitting element for visible light which is low in price is also appropriately set, as described in the above (2). This makes it possible to provide a light irradiating apparatus well balanced in cost and performance.

Further, in the light curing type ink, the difference occurs in the wavelength region of light absorbed when irradiated, depending on the difference in composition of a color material component (pigment, dye or the like) and other components. This causes the occurrence of the difference in curing time of the ink in some cases.

Consequently, light irradiation in a wide wavelength region having a plurality of light emitting peaks becomes possible by using a construction in which light emitting elements different in the light emitting wavelength peak are arranged, as the arrangement of the plurality of light emitting elements, as described in the above (4). Even when light of a part of the light emitting peaks is absorbed, light of the other light emitting peaks effectively contributes to curing of the ink to make it possible to stably maintain the curing efficiency of the ink. Thus, it becomes possible that irradiating light to be absorbed complies with various kinds of light curing type inks different in the light emitting wavelength peak. As a result, the ink species to be complied with can be increased to improve the versatility as the light emitting apparatus.

When the aspect ratio of the elliptical light images is set to 2.0 or more as described in the above (5), the difference in an arrangement space between the light emitting elements between the case where the elliptical light images are arranged along the major axis direction and the case where arranged along the minor axis direction becomes extremely significant, compared to the case where light emitting elements which form elliptical light images having an aspect ratio of less than 2.0 are employed. A reduction in the number of the light emitting elements used as the light sources and enlargement of the space between the light emitting elements assist diffusion of heat generated by the light emitting elements, and the effect of preventing the light emitting elements from deteriorating by thermal damage due to accumulated heat becomes clear.

Further, as described in the above (6), when the semiconductor laser element is employed as the light emitting element, outgoing light forms an elliptical light image for structural reasons of the element itself such as a semiconductor laser diode that is a semiconductor laser, and it becomes possible to obtain the elliptical light image effective for enlargement of the space between the light emitting elements without using a special optical means.

Furthermore, in light emission by the semiconductor laser element, outgoing light diffuses compared to light emission of a solid laser, so that the wider area can be irradiated with a light beam by one light emitting element. This is therefore suitable for decreasing the light emitting elements used, and at the same time, a combination with a scanning mechanism for enlarging the irradiation area of a light beam becomes unnecessary. This makes it possible to secure the wide irradiation area of the light beam at a low price.

In addition, installation of the scanning mechanism becomes unnecessary, so that such a construction that the light emitting element is attached to a movable part for scanning becomes unnecessary. Accordingly, it becomes possible to improve operational reliability and durability as the light irradiating apparatus by employing design excluding the movable part which causes malfunction.

When the semiconductor laser element is employed as the light emitting element, in order to obtain the light irradiating apparatus described in the above (3), it is preferred that the semiconductor laser element which emits an ultraviolet ray having a wavelength of less than 400 nm and the semiconductor laser element which emits visible light having a wavelength of 400 to 450 nm are arranged alone or in an appropriately mixed state thereof, as described in the above (7) to (9).

Further, for example, when the light emitting element is used for applications in which the light curing type ink adhered onto the recording medium by a print head in the ink jet printer is cured by light irradiation, it is considered that the light emitting element is allowed to achieve continuous light emission toward a coated area of the light curing type ink during print processing of the printer as described in (11). However, when the light emitting element is allowed to achieve continuous light emission, the amount of irradiated light possibly reaches the amount equal to or more than the amount necessary for curing processing of the light curing type ink. In such a case, the light emitting element is allowed to intermittently achieve pulse light emission as described in (12), thereby controlling the amount of light irradiated to the light curing type ink to the necessary amount to be able to achieve a reduction in power consumption in the light irradiating apparatus, a reduction in heat generation of the light emitting element, and prolongation of life by shortening the actual working hours of the light emitting element.

Figure 1:
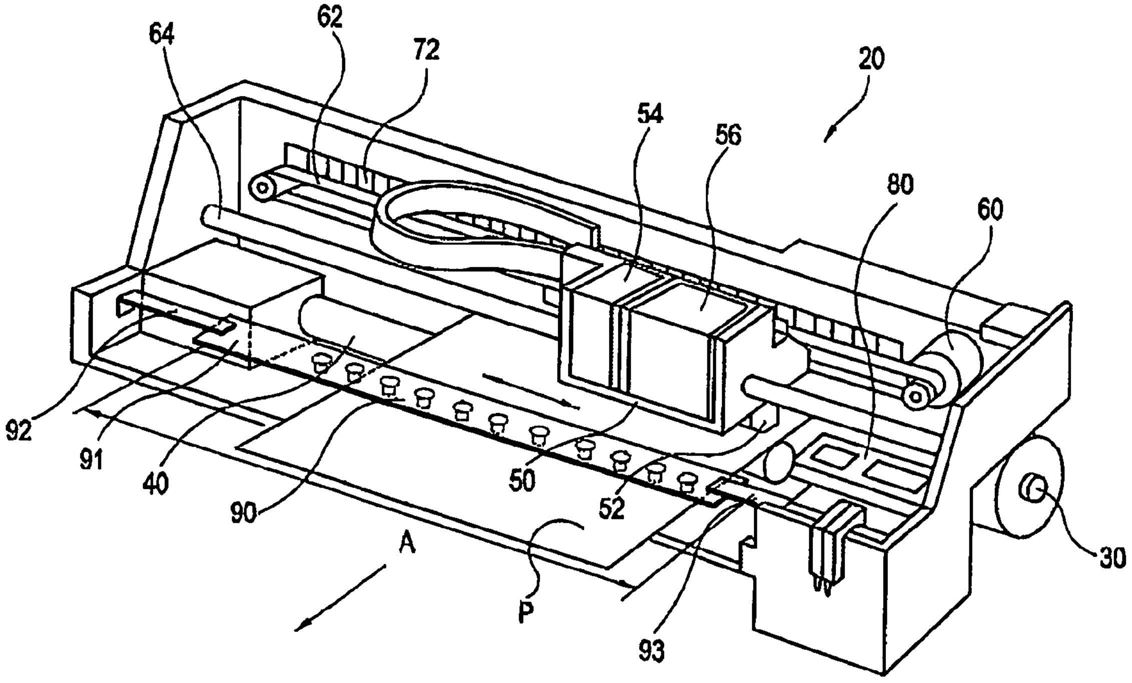
FIG. 1 is a schematic perspective view showing a main construction of one embodiment of an ink jet printer equipped with a light irradiating apparatus according to the invention.

The reference numerals used in the drawings denote the followings, respectively.

20; Ink Jet Printer, 30: Paper Feed Motor, 32: Rotary Encoder, 34: Paper Feed Roller, 40: Platen, 50: Carriage, 52: Print Head (Recording Head), 54: Black Cartridge, 56: Color Ink Cartridge, 60: Carriage Motor, 62: Tow Belt, 64: Guide Rail, 70: Linear Encoder, 72; Coding Plate, 74: Photo Sensor, 80: Capping Device; 90: Light Irradiating Apparatus, 91: Element Support Means, 91*a*: Attachment Surface, 92: Bracket, 93: Bracket, 95; Light Emitting Element, 102: Main Control Circuit, 104: CPU, 110: ROM, 112; RAM, 114: EEPROM, 120: Interface Circuit, 130: Paper Feed Motor Driving Circuit, 140: Head Driving Circuit, 150: CR Motor Driving Circuit, 160: Light Irradiating Apparatus Driving Circuit, P: Print Paper (Recording Medium)

DETAILED DESCRIPTION OF THE INVENTION

A suitable embodiment of the light irradiating apparatus according to the invention will be described below in detail with reference to the drawings.

FIG. 1 is a schematic perspective view showing a main construction of one embodiment of an ink jet printer 20 equipped with a light irradiating apparatus according to the invention.

This printer 20 comprises a paper feed motor 30 for feeding print paper P that is a recording medium, a platen 40, a print head 52 as a recording head for reducing a light curing type ink to fine particle size and ejecting it to the print paper P, thereby adhering it to the print paper P, a carriage 50 equipped with the print head 52, a carriage motor 60 for moving the carriage 50 in a main scanning direction, and a light irradiating apparatus 90 for irradiating light of a specific wavelength region to an ink-adhered surface of the print paper P to which the light curing type ink is adhered by means of the print head 52.

The carriage 50 is towed by means of a tow belt 62 driven by the carriage motor 60 and moves along a guide rail 64. The carriage 50 is equipped with a black cartridge 54 as a black ink container accommodating a black ink supplied to the print head 52 and a color ink cartridge 56 as a color ink container accommodating a color ink supplied to the print head 52, as well as the print head 52.

A capping device 80 for sealing a nozzle surface of the print head 52 at the time of stop is provided in a home position of the carriage 50 (a position on a right side in FIG. 1). When a printing job is ended and the carriage 50 reaches an upper part of the capping device 80, the capping device 80 is automatically lifted by means of a mechanism not shown to seal the nozzle surface of the print head 52. By this capping, the ink in a nozzle can be prevented from being dried. The positioning control of the carriage 50 is carried out, for example, in order to accurately place the carriage 59 in the position of the capping device 80.

Figure 2:
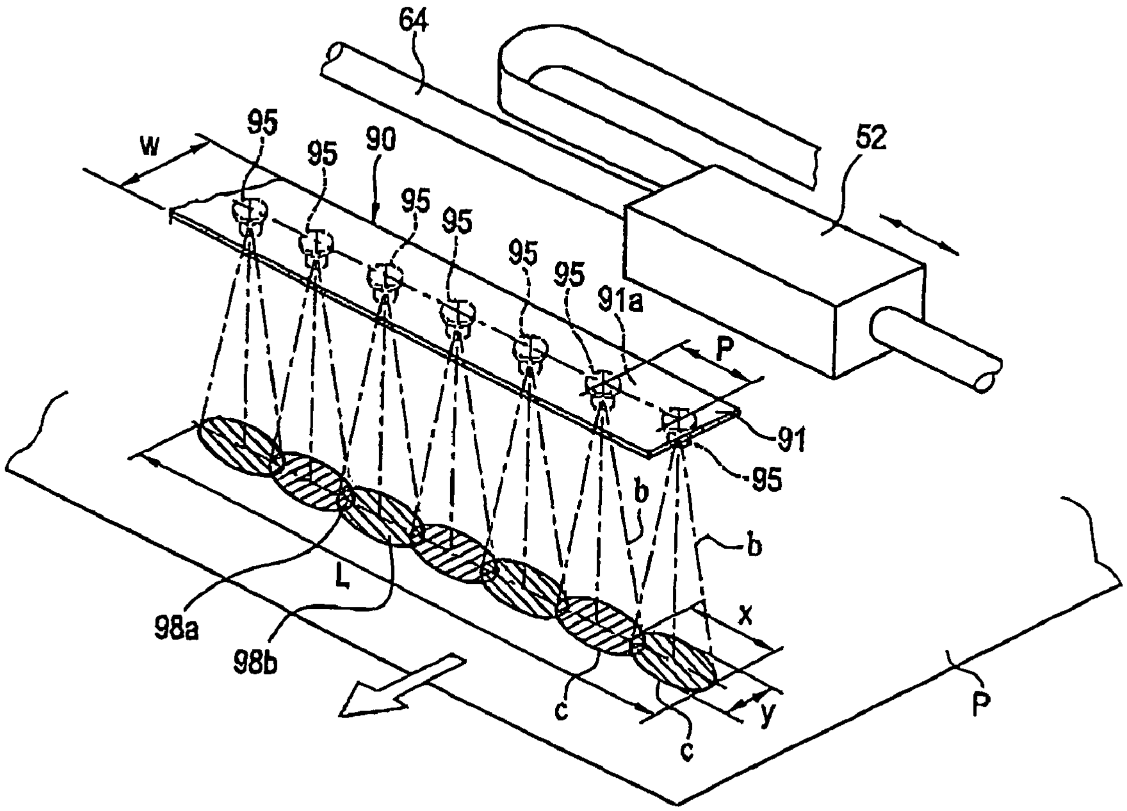
FIG. 2 is an enlarged perspective view of the light irradiating apparatus shown in FIG. 1.

As shown in FIGS. 1 and 2, the light irradiating apparatus 90 comprises a plurality of light emitting elements 95 for emitting light of a specific wavelength region, an element support means 91 for supporting these light emitting elements 95 in a line along the width direction of the print paper P, brackets 92 and 93 for fixing the element support means 91 to a housing of the printer 20, and a light irradiating apparatus driving circuit 160 (see FIG. 3) for controlling the light emission and light-out of the respective light emitting elements 95.

The element support means 91 is a plate-shaped structural member having a predetermined width W (see FIG. 2) along the transfer direction of the print paper P in the printer 20 and a predetermined length A (see FIG. 1) along the width direction of the print paper P. The length A is set to be greater than the maximum width of paper which can be handled in the printer 20.

The element support means 91 is disposed in parallel with a surface of the print paper P which acts as a surface to be irradiated with light, and fixed to the housing of the printer 20 by means of the brackets 92 and 93.

Then, a surface opposite to the surface of the print paper P of the element support means 91 is an attachment surface 91*a* for attaching the light emitting elements 95.

Further, a position in which the element support means 91 is installed is a position apart from the print head 52 by a definite distance downstream in the transfer direction of the print paper P.

The brackets 92 and 93 fix ends of the element support means 91 to the housing of the printer 20 with a screw or through concavo-convex fitting.

In the case of this embodiment, all of the light emitting elements 95 emit light b in a specific wavelength region which is effective for curing the light curing type ink ejected and applied to the print paper P by the print head 52, and form elliptical light images c on the surface of the print paper P, which is a surface to be irradiated.

The elliptical light image c shows an irradiation area of the light emitted from each light emitting element 95 on the print paper P. Each light image c is in the same-sized form having a major axis size of x and a minor axis size of y.

Further, in this specification, similarly to the slenderness ratio of a rectangle, the ratio x/y of the major axis size x to the minor axis size y of an ellipsoid is defined as the aspect ratio. As each light emitting element 95, there is used one which gives an elliptical light image c having an aspect ratio of 2.0 or more.

Further, on the attachment surface 91*a* of the element support means 91, the light emitting elements 95 are arranged in a line along the width direction of the print paper P, as shown in FIG. 2.

The total number of the light emitting elements 95 installed in a line on the attachment surface 91*a* is n. These n light emitting elements 95 are mutually attached to the attachment surface 91*a* at a predetermined arrangement space p so that the light images c are made continuous along the major axis direction, overlapping their end portions in the major axis direction one another.

As a result, there is formed an approximately strip-shaped irradiation area 98 in which the light images c are alternately arranged along the width direction of the print paper P.

This irradiation area 98 has a construction in which an irradiation area 98*a* having a strong irradiation intensity formed by overlapping the end portions of the light images c adjacent to one another and an irradiation area 98*b* having a basic irradiation density in the light images c are alternately arranged.

When the total number of the light emitting elements 95 used is n, this irradiation area 98 is in an approximately strip-shaped form having a size of L (L is nearly equal to np) in the width direction of the print paper P and a size of y in the transfer direction of the print paper P.

Further, in the case of this embodiment, semiconductor laser elements are employed as the light emitting elements 95. In the selection of the light emitting element, it is preferred to select one in which the peak wavelength of light of a specific wavelength region output from the semiconductor laser element is not coincident with the absorption wavelength of the light absorbing substance in the ultraviolet curing type ink.

For example, as a light emitting element which emits an ultraviolet ray having a wavelength of 400 nm or less, there are employable one having a model name of NDHU 110APAE2 (oscillation wavelength: 370 to 380 nm) of a semiconductor laser diode series manufactured by Nichia Corporation and the like, by way of example.

On the other hand, as one which emits visible light having a wavelength of 400 nm to 450 nm, there are employable ones having model names of NDHV310APC and NDHV220APAE1 (oscillation wavelength: 400 to 415 nm) of a semiconductor laser diode series manufactured by Nichia Corporation or one having a model name of NDHB20APAE1 (oscillation wavelength: 435 to 445 nm) an the like.

Figure 3:
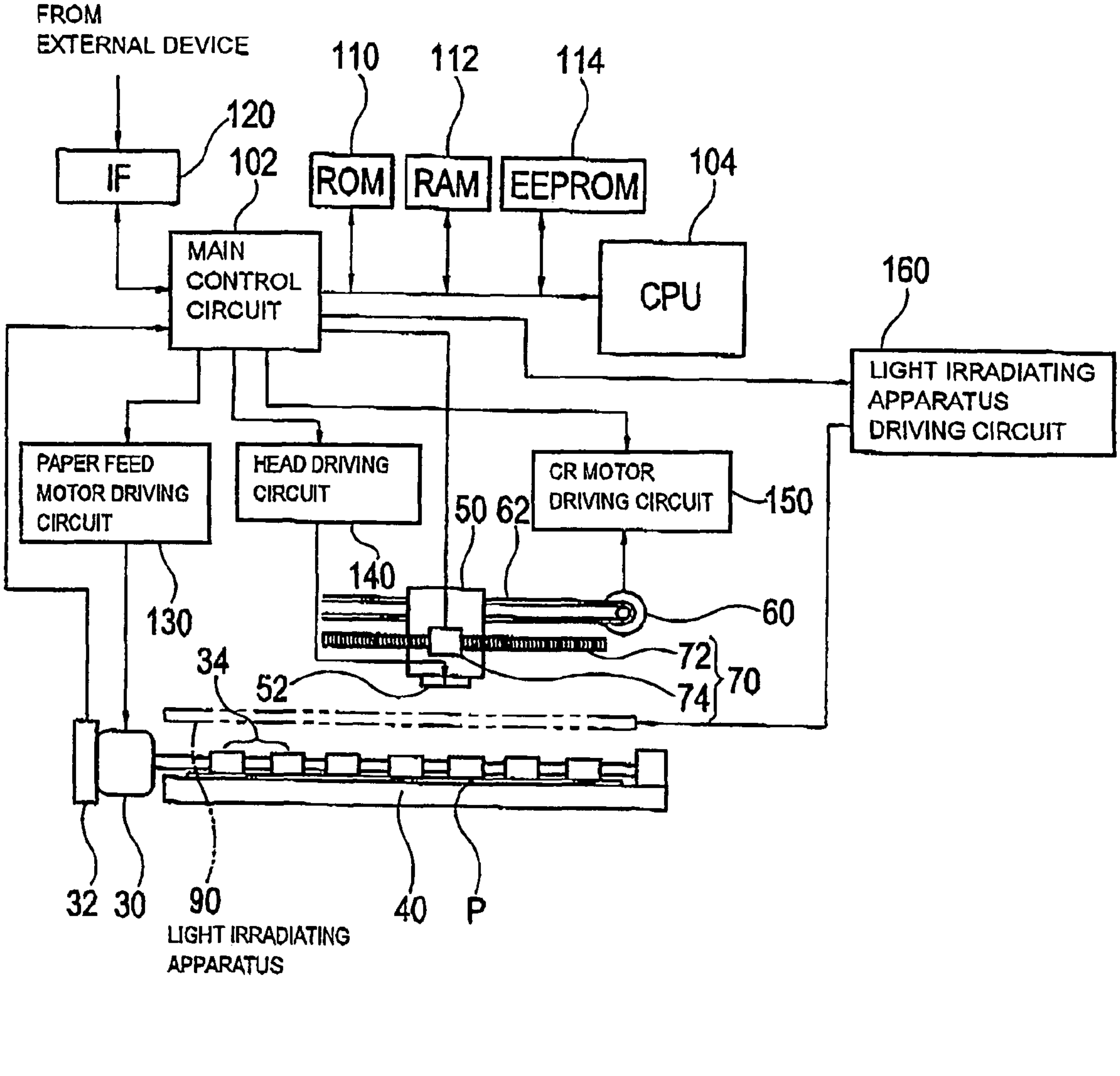
FIG. 3 is a block diagram showing an electric construction in the ink jet printer shown in FIG. 1.

Then, the electric construction of the printer 20 will be described with reference to FIG. 3. FIG. 3 is a block diagram showing the electric construction of the printer 20. The printer 20 comprises a main control circuit 102, a CPU 104, and various memories (an ROM 110, an RAM 112 and an EEPROM 114) connected to the main control circuit 102 and the CPU 104 through buses.

To the main control circuit 102, there are connected an interface circuit 120 for communicating a signal with an external device such as a personal computer, a paper feed motor driving circuit 130, a head driving circuit 140, a CR motor driving circuit 150, and a light irradiating apparatus driving circuit 160 for controlling an operation of the light irradiating apparatus 90.

The paper feed motor 30 is driven by the paper feed motor driving circuit 130 to rotate a paper feed roller 34, thereby moving the print paper P in the transfer direction. The paper feed motor 30 is provided with a rotary encoder 32, and a signal output from the rotary encoder 32 is input to the main control circuit 102.

The print head 52 having a plurality of nozzles (not shown) is provided on a bottom face of the carriage 50. Each nozzle is driven by the head driving circuit 140 to eject droplets of the ultraviolet curing type ink supplied from each cartridge 54 or 56 toward a recording medium such as paper, cloth or film.

The carriage motor 60 is driven by the CR motor driving circuit 150. This printer 20 is provided with a linear encoder 70 for detecting the position and speed of the carriage 50 along the main scanning direction. This linear encoder 70 is constituted by a linear coding plate 72 provided in parallel with the main scanning direction and a photo sensor 74 attached to the carriage 50. An output signal from the linear encoder 70 is input to the main control circuit 102.

The light irradiating apparatus driving circuit 160 controls the light emission and light-out of the respective light emitting elements 95, based on a control signal sent from the main control circuit 102.

Specifically, when the print head 52 is driven to start printing or when the printing operation is started and an adhered surface of the ultraviolet curing type ink on the print paper P reaches the irradiation area 98 of the light of a specific wavelength region according to the light irradiating apparatus 90, all of the light emitting elements 95 installed on the element support member 91 are brought into a light emitting state, and the light emitting state of the respective light emitting elements 95 is maintained until the adhered surface of the ultraviolet curing type ink on the print paper P completely passes through the irradiation area 98 of the light of a specific wavelength region according to the light irradiating apparatus 90. That is to say, the respective light emitting elements 95 are allowed to continuously emit light until the adhered surface of the ultraviolet curing type ink on the print paper P has passed through the irradiation area 98 of the light of a specific wavelength region according to the light irradiating apparatus 90.

The main control circuit 102 has the function of supplying a control signal to the four driving circuits 130, 140, 150 and 160, respectively, and also has the function of executing the decoding of various print commands received by the interface circuit 120, the control related to the regulation of print data, the monitoring of various sensors, and the like. On the other hand, the CPU 104 has various functions for assisting the main control circuit 102, and executes, for example, the control of various memories, and the like.

In the light irradiating apparatus 90 described above, the light emitting elements are arranged with spacing from one another in the major axis direction of the light images c so that the elliptical light images c formed by the respective light emitting elements 95 are made continuous along the major axis direction of the ellipsoids. Accordingly, there can be performed the light irradiating process of forming the approximately strip-shaped irradiation area 98 in which the light images c are continuously arranged along the major axis direction, in the ink coating area on the print paper P.

Figure 4:
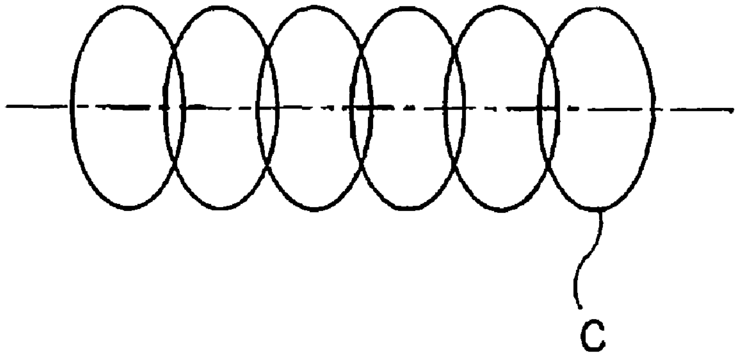
FIG. 4 is an illustrative view of an irradiation area at the time when a plurality of light emitting elements which form elliptical light images are mutually arranged so that the elliptical light images given by the respective elements are made continuous along the minor axis direction thereof.

Then, compared to the case of the light irradiating apparatus as shown in FIG. 4 in which the light emitting elements are mutually arranged so that the elliptical light images c are made continuous along the minor axis direction, the space p between the light emitting elements adjacent to one another can be set large. Further, as shown in FIG. 2 as the approximately strip-shaped irradiation area 98, it becomes possible to irradiate light of a specific wavelength region over the larger width L by the smaller number of light emitting elements used.

Accordingly, when light of a specific wavelength region is irradiated over a predetermined width of a surface to be irradiated, it becomes possible to reduce the number of light emitting elements used as light sources to lower cost.

The outgoing light from each light emitting element 95 is turned to diffused light. Accordingly, when the attachment position of the element support means 91 is adjusted to change the distance between the light emitting element 95 and the surface to be irradiated on the print paper P, the major axis size x and the minor axis size y of the light image c change based on this.

When a semiconductor laser diode having a model name of NDHV 310APC (light diffusion in FWHM is (θ||) 8° in the minor axis direction of the light image, and (θ⊥) 22° in the major axis direction of the light image) manufactured by Nichia Corporation was used and the distance (irradiation distance) between the light emitting element 95 and the surface to be irradiated on the print paper P was 30 mm in this embodiment, the light image c had a major axis size x of 24.1 mm, a minor axis size y of 9.95 mm and an aspect ratio of 2.20.

On the other hand, when the distance (irradiation distance) between the same light emitting element and the surface to be irradiated on the print paper P was 50 mm, the light image c had a major axis size x of 39.1 mm, a minor axis size y of 15.5 mm and an aspect ratio of 2.36.

Then, for the case of each irradiation distance, on the assumption that the width of the print paper P is A4-size width, and that the irradiation area 98 is formed fully in its paper width, the number of light emitting elements needed was compared between the case of the light emitting element arrangement shown in FIG. 2 and the case of the element arrangement for comparison shown in FIG. 4.

When the irradiation distance was 30 mm, the number of light emitting elements needed was 9 for the element arrangement of the embodiment shown in FIG. 2. In contrast, 22 light emitting elements were needed for the element arrangement of the comparative example shown in FIG. 4. It was confirmed that the number of elements could be significantly decreased according to the above-mentioned embodiment.

Further, when the irradiation distance was 50 mm, the number of light emitting elements needed was 6 for the element arrangement of the embodiment shown in FIG. 2. In contrast, 14 light emitting elements were needed for the element arrangement of the comparative example shown in FIG. 4. In this case, it was also confirmed that the number of elements could be significantly decreased according to the above-mentioned embodiment.

Furthermore, the space distance p between the light emitting elements 95 as the light sources can be set large, so that heat generated from the respective light emitting elements 95 becomes difficult to be accumulated between the light emitting elements 95, which can prevent the light emitting elements 95 themselves from suffering from thermal damage due to the accumulated heat, thereby being able to prevent a decrease in life of the light sources due to their thermal damage.

Accordingly, when mounted on the periphery of the print head 52 of the ink jet printer 20 to cure by light irradiation the light curing type ink adhered onto the print paper P as the recording medium by means of the print head 52 of the printer 20, heat generation of the light irradiating apparatus 90 itself can be inhibited. It becomes therefore unnecessary to install a cooling operation and means such as a cooling fun on the printer 20, which also largely contributes to miniaturization of the ink jet printer 20 and cost reduction.

In addition, the light curing type ink can allow the curing action to effectively proceed by the irradiation of an ultraviolet ray having a specific wavelength. However, even when visible light close to the ultraviolet ray is irradiated in place of the ultraviolet ray, curing processing is possible although the processing efficiency decreases, compared to the case of the ultraviolet irradiation.

In general, a light emitting element which emits an ultraviolet ray is more expensive than a light emitting element which emits visible light.

Consequently, taking into account the difference in price between the light emitting element for an ultraviolet ray and the light emitting element for visible light, the processing speed required and the like, the adoption of the light emitting element for visible light which is low in price is also appropriately set. This makes it possible to provide the light irradiating apparatus 90 well balanced in cost and performance.

Further, in the light curing type ink, the difference occurs in the wavelength region of light absorbed when irradiated, depending on the difference in composition of a color material component (pigment, dye or the like) and other components. This causes the occurrence of the difference in curing time of the ink in some cases.

Consequently, light irradiation in a wide wavelength region having a plurality of light emitting peaks becomes possible by using light emitting elements different in the light emitting wavelength peak in the arrangement of the plurality of light emitting elements, like the above-mentioned embodiment. Even when light of a part of the light emitting peaks is absorbed, light of the other light emitting peaks effectively contributes to curing of the ink to make it possible to stably maintain the curing efficiency of the ink. Thus, it becomes possible that irradiating light to be absorbed complies with various kinds of light curing type inks different in the light emitting wavelength peak. As a result, the ink species to be complied with can be increased to improve the versatility as the light emitting apparatus 90.

When the aspect ratio of the elliptical light images c is set to 2.0 or more like this embodiment, the difference in an arrangement space between the light emitting elements between the case where the elliptical light images c are arranged along the major axis direction and the case where they are arranged along the minor axis direction becomes extremely significant, compared to the case where light emitting elements which form elliptical light images c having an aspect ratio of less than 2.0 are employed. A reduction in the number of the light emitting elements 95 used as the light sources and broadening of the space between the light emitting elements 95 assist diffusion of heat generated by the light emitting elements 95, and the effect of preventing the light emitting elements 95 from deteriorating by thermal damage due to accumulated heat becomes clear.

Further, when the semiconductor laser element is employed as the light emitting element 95 like this embodiment, outgoing light forms an elliptical light image c for structural reasons of the element itself such as a semiconductor laser diode that is a semiconductor laser, and it becomes possible to obtain the elliptical light image c effective for enlargement of the space between the light emitting elements 95 without using a special optical means.

Furthermore, in light emission by the semiconductor laser element, outgoing light diffuses compared to light emission of a solid laser, so that the wider area can be irradiated with a light beam by one light emitting element 95. This is therefore suitable for decreasing the light emitting elements used, and at the same time, a combination with a scanning mechanism for enlarging the irradiation area of a light beam becomes unnecessary. This makes it possible to secure the wide irradiation area of the light beam at a low price.

In addition, installation of the scanning mechanism becomes unnecessary, so that such a construction that the light emitting element 95 is attached to a movable part for scanning becomes unnecessary. Accordingly, it becomes possible to improve operational reliability and durability as the light irradiating apparatus 90 by employing design excluding the movable part which causes malfunction.

In the above-mentioned embodiment, the light emitting elements 95 were arranged in a line. However, they may be arranged in a plurality of lines parallel to each other. By arranging the light emitting elements in a plurality of lines parallel to each other, the whole irradiating area can be set to an arbitrary size along the transfer direction of the print paper P without being restricted by the major axis size x and the minor axis size y of the elliptical light image formed by the single light emitting element, and by increasing the number of light emitting element lines to enlarge the irradiating area of light in the transfer direction of the recording medium, the speeding up of processing can be achieved.

Figure 5:
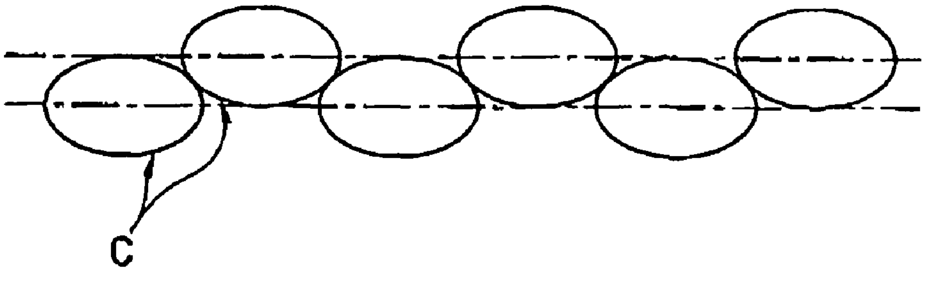
FIG. 5 is a view showing another example of a continuous state of the elliptical light images c.

Further, the continuous state of the elliptical light images c along the width direction of the print paper P may be as shown in FIG. 5.

Furthermore, it is desirable to select the light emitting wavelength of the semiconductor laser element used as the light emitting element in the invention according to characteristics of the light curing type ink to be treated. Depending on characteristics of the light curing type ink, it is possible to select a suitably usable one, other than those having the light emitting wavelengths shown in the above-mentioned embodiment.

In addition, the light emitting element which can be used in the invention is not limited to the semiconductor laser element. Any light emitting element other than the semiconductor laser element can also be used, as long as it is an element in which a light flux emitted from the element is turned to diffused light to be able to form an elliptical light image.

Further, even when the light emitting element line is formed by light emitting elements which emit light of an approximately similar wavelength region, the light emitting element line can be formed by only those having the same light emitting wavelength peak, or by mixing those different in the light emitting wavelength peak.

Furthermore, in the above-mentioned embodiment, the light emitting element 95 in the light irradiating apparatus 90 is allowed to achieve continuous light emission during print processing. However, the light emitting element 95 may be allowed to achieve pulse light emission by a predetermined time unit so as to restrain the amount of light irradiated to the light curing type ink to the bare minimum, based on the characteristics of the light curing type ink used or the information of a print region (such as the amount of the light curing type ink applied by ejection).

Thereby, the amount of light irradiated to the light curing type ink is controlled to the bare minimum to be able to achieve a reduction in power consumption in the light irradiating apparatus 90, a reduction in heat generation of the light emitting element 95, and prolongation of life by shortening the actual working hours of the light emitting element 95.

An instrument to be equipped with the light irradiating apparatus of the invention is not limited to the ink jet printer. It can be installed on various instruments which perform adhesion of the light curing type ink.

Further, as materials for the recording medium to which light of a specific wavelength region is irradiated by the light emitting apparatus of the invention, there are considered various ones such as paper, film, fabric and thin metal plate.

The light curing type inks which are curable by the light emitting apparatus of the invention are not particularly limited to, but include well-known inks described, for example, in JP-A-3-216379, JP-A-5-186725, JP-B-5-54667, JP-A-6-200204, JP-A-7-224241, JP-A-8-48922, JP-A-8-218016, JP-A-10-7956, JP-A-10-250052, JP-A-10-324836, JP-A-2000-44857, JP-A-2000-119574, JP-A-2000-158793, JP-A-2000-186242, JP-A-2000-186243, JP-A-2000-336295, JP-A-2000-504778 (the term "JP-T" as used herein means a published Japanese translation of a PCT patent application), JP-A-2001-512777, JP-A-2001-220526, JP-A-2002-80767, JP-A-2003-191593, JP-A-2003-191594, JP-A-2003-313476, JP-A-2004-27154 and U.S. Pat. No. 5,623,001.

Of these, particularly preferred is one which contains at least a polymerizable compound, a photopolymerization initiator and a polymerization accelerator, and contains an N-vinyl compound as the polymerizable compound and two or more selected from the group consisting of a bisacylphosphine oxide, a monoacylphosphine oxide and an α-aminoketone as the photo-polymerization initiator.

All of the bisacylphosphine oxide, monoacylphosphine oxide and α-amino ketone used in the above-mentioned ink composition absorb light having a wavelength of 365 nm or more. In particular, the bisacylphosphine oxide and monoacylphosphine oxide have absorption in a longer wavelength range than the α-amino ketone.

The bisacylphosphine oxides include, for example, bis(2,4,6-trimethylbenzoyl)-phenylphosphine oxide and the like, which is available as the trade name of Irgacure 819 (manufactured by Ciba Specialty Chemicals).

The monoacylphosphine oxides include, for example, 2,4,6-trimethylbenzoyl-diphenyl-phosphine oxide and the like, which is available as the trade name of Darocur TPO (manufactured by Ciba Specialty Chemicals).

The α-amino ketones include, for example, 2-benzyl-2-dimethylamino-1-(4-morpholinophenyl)-butanone-1 and the like, which is available as the trade name of Irgacure 369 (manufactured by Ciba Specialty Chemicals).

In the above-mentioned light curing type ink, another photopolymerization initiator may be used in combination, as long as the ink composition contains at least two or more of the above-mentioned compounds as the photopolymerization initiator.

Typical examples of the other photopolymerization initiators which may be used in combination include benzoin methyl ether, benzoin ethyl ether, isopropyl benzoin ether, isobutyl benzoin ether, 1-phenyl-1,2-propanedione-2-(o-ethoxycarbonyl)oxime, benzil, diethoxyacetophenone, benzophenone, chlorothioxanthone, 2-chlorothioxanthone, isopropylthioxanthone, diethylthioxanthone, 2-methylthioxanthone, polychlorinated polyphenyl, hexachlorobenzene and the like. Preferred are isobutyl benzoin ether and 1-phenyl-1,2-propanedione-2-(o-ethoxycarbonyl)oxime.

Further, there can also be used photopolymerization initiators available as trade names of Vicure 10 and 30 (manufactured by Stauffer Chemical), Irgacure 127, 184, 500, 651, 2959, 907, 379, 754, 1700, 1800 and 1850, OXE01, Darocure 1173 and ITX (manufactured by Ciba Specialty Chemicals), Quantacure CTX and ITX (manufactured by Aceto Chemical), Kayacure DETX-S (manufactured by Nippon Kayaku Co., Ltd.), ESACURE KI150 (manufactured by Lamberti), and Lucirin TPO (manufactured by BASF).

As the polymerizable compound contained in the light curing type ink, what is necessary is just to contain at least an N-vinyl compound.

The N-vinyl compounds include N-vinylforamide, N-vinylcarbazol, N-vinylacetamide, N-vinylpyrrolidone, N-vinylcaprolactam, derivatives thereof and the like.

Further, the light curing type ink may contain another polymerizable compound other than the N-vinyl compound, as the polymerizable compound.

The other polymerizable compound is not particularly limited, as long as it is polymerized by radicals or ions formed from the photopolymerization initiator. Such a polymerizable compound means a molecule which can be a constitutional unit of a basic structure of a polymer. Such a polymerizable compound is also referred to as a photopolymerizable monomer, and includes a monofunctional monomer, a bifunctional monomer, and a polyfunctional monomer.

As typical examples of such polymerizable compounds, the monofunctional monomers include (2-methyl-2-ethyl-1,3-dioxolan-4-yl)methyl acrylate, (2-methyl-2-isobutyl-1,3-dioxolan-4-yl)methyl acrylate, phenoxyethyl acrylate, isobornyl acrylate, methoxydiethylene glycol monoacrylate, acryloylmorpholine, lauryl methacrylate, allyl glycol, 2-hydroxyethyl methacrylate, cyclohexyl methacrylate, oxetane methacrylate and the like.

The bifunctional monomers include ethylene glycol dimethacrylate, diethylene glycol diacrylate, diethylene glycol dimethacrylate, tripropylene glycol diacrylate, 1,9-nonanediol diacrylate, polyethylene glycol #400 diacrylate, tetraethylene glycol dimethacrylate, 1,6-hexanediol diacrylate, 1,6-hexanediol dimethacrylate, neopentyl glycol diacrylate, neopentyl glycol dimethacrylate, 2-hydroxy-1,3-dimethacryloxypropane, hydroxypioperinoic acid ester neopentyl glycol diacrylate and the like.

The polyfunctional monomers include trimethylolpropane triacrylate, trimethylolpropane trimethacrylate, trimethylolpropane EO-adduct triacrylate, trimethylolpropane PO-adduct triacrylate, glycerin EO-adduct triacrylate, glycerin EO-modified triacrylate, glycerin PO-adduct triacrylate, pentaerythritol triacrylate, dipentaerythritol hexaacrylate, (2,2,2-triacryloyloxymethyl)ethyl hydrogen phthalate, dipentaerythritol polyacrylate and the like.

Of the above-mentioned monofunctional monomers, bifunctional monomers and polyfunctional monomers used in combination as monomers other than the N-vinyl compound, preferred are acryloylmorpholine (monofunctional monomer), phenoxyethyl acrylate (monofunctional monomer), tripropylene glycol diacrylate (bifunctional monomer), (2,2,2-triacryloyloxymethyl)ethyl hydrogen phthalate (polyfunctional monomer) and glycerin EO-modified triacrylate (polyfunctional monomer). However, the invention is not limited to these combined uses.

As the polymerization accelerator contained in the light curing type ink, what is necessary is just to contain fine particles having at least a polymerizable functional group.

The polymerization acceleration mechanism of the fine particles onto which polymerizable functional groups are introduced is not clear but is presumed that radicals formed from the photopolymerization initiator which has absorbed an ultraviolet ray and has cleaved are trapped and stabilized on surfaces of the fine particles and easily initiate the polymerization with the polymerizable functional groups introduced onto the surfaces of the fine particles and the polymerizable compound adsorbed on the surfaces, thereby accelerating the polymerization reaction.

The polymerizable functional group-containing fine particles are not particularly limited but are those generally referred to as extenders. Inorganic compounds such as silica, alumina, titania and calcium oxide are exemplified. In particular, transparent ones such as silica and alumina can be suitably used, and silica is particularly preferred among others.

Further, the polymerizable functional group contained in the fine particles is not particularly limited, and an acryloyl group, a methacryloyl group or the like is exemplified. Furthermore, it is also possible to use a polymerizable functional group having one or more double bonds.

The size of the fine particles is not particularly limited, but preferred are those having a particle size of 10 to 200 nm.

Although a method for preparing the polymerizable functional group-containing fine particles is not particularly limited, there is mentioned a method comprising preparing silica fine particles having a large number of hydroxyl groups by a sol-gel reaction of a silane compound such as tetraethoxysilane, and then, reacting them with a compound capable of imparting polymerizable functional groups to the hydroxyl groups (silane coupling agent).

The content of the polymerizable functional group-containing fine particles in the light curable ink composition is not particularly limited, and should be suitably selected depending on the type of usage, the conditions, the relation between the viscosity and polymerizability of the ink composition, and the like. However, it is preferably 10% by weight or less based on the whole amount of the ink composition.

Further, the light curing type ink may contain one other than the polymerizable fine particles as a polymerization accelerator.

Although the other polymerizable compound is not particularly limited, an aminobenzoate derivative is particularly preferred in view of an odor problem and more reliable curing of the ink composition. This is because the aminobenzoate derivative reduces polymerization inhibition induced by oxygen.

The aminobenzoate derivative does not have absorption in a wavelength range of 350 nm or more. Examples of such aminobenzoate derivatives are not particularly limited, but include ethyl 4-dimethylaminobenzoate and 2-ethylhexyl 4-dimethylaminobenzoate, which are available as trade names of Darocur EDB and EHA (manufactured by Ciba Specialty Chemicals).

The light curable ink composition contains a color material.

The color material contained in the light curable ink composition may be either a dye or a pigment. However, when permeation of a coloring component in the ink composition is restrained by the action of insolubilization or thickening of the ink composition, the pigment dispersed in the ink is more advantageous than the dye dissolved in the ink. Further, the pigment is more advantageous in view of image durability of printed matter.

As the dyes used in the light curable ink composition, there can be used various dyes usually used in inkjet recording, such as a direct dye, an acid dye, a food dye, a basic dye, a reactive dye, a disperse dye, a vat dye, a soluble vat dye, and a reactive disperse dye.

As the pigment used in the above-mentioned light curing type ink, an inorganic pigment or an organic pigment can be used without particular limitation.

As the inorganic pigment, there can be used carbon black produced by known processes such as a contact process, a furnace process and a thermal process, in addition to titanium oxide and iron oxide. Further, as the organic pigment, there can be used an azo pigment (including an azo lake, an insoluble azo pigment, a condensed azo pigment, a chelate azo pigment and the like), a polycyclic pigment (including a phthalocyanine pigment, a perylene pigment, a perynone pigment, an anthraquinone pigment, a quinacrydone pigment, a dioxazine pigment, a thioindigo pigment, an isoindolinone pigment, a quinofuralone pigment and the like), a dye chelate (including a basic dye type chelate, an acid dye type chelate and the like), a nitro pigment, a nitroso pigment, aniline black and the like.

As specific examples of the pigments, carbon blacks include No. 2300, No. 900, MCF88, No. 33, No. 40, No. 45, No. 52, MA 7, MA 8, MA 100, No. 2200B and the like manufactured by Mitsubishi Chemical Corp.; Raven 5750, 5250, 5000, 3500, 1255 and 700, and the like manufactured by Columbia; Regal 400R, 330R and 660R, Mogul L and 700, Monarch 800, 880, 900, 1000, 1100, 1300 and 1400, and the like manufactured by Cabot; and Color Black FW1, FW2, FW2V, FW18 and FW200, Color Black S150, S160, and S170, Printex 35, U, V, and 140U, Special. Black 6, 5, 4A, and 4, and the like manufactured by Degussa.

The pigments used in a yellow ink include C. I. Pigment Yellow 1, 2, 3, 12, 13, 14, 16, 17, 73, 74, 75, 83, 93, 95, 97, 98, 109, 110, 114, 128, 129, 138, 150, 151, 154, 155, 180, 185 and the like.

Further, the pigments used in a magenta ink include C. I. Pigment Red 5, 7, 12, 48 (Ca), 48 (Mn), 57 (Ca), 57:1, 112, 122, 123, 168, 184, 202 and 209, C. I. Pigment Violet 19 and the like.

Furthermore, the pigments used in a cyan ink include C. I. Pigment Blue 1, 2, 3, 15:3, 15:4, 60, 16, 22 and the like.

According to a preferred embodiment of the light curable ink, the average particle size of the pigment is preferably in the range of 10 to 200 nm, and more preferably about 50 to 150 nm.

The amount of the color material added in the ink composition is preferably in the range of about 0.1 to 25% by weight, and more preferably in the range of about 0.5 to 15% by weight.

According to a preferred embodiment of the light curable ink, the pigment is preferably added to the ink composition as a pigment dispersion obtained by dispersing it in an aqueous medium with a dispersant or a surfactant. As the preferred dispersant, there can be used a dispersant conventionally used for preparing a pigment dispersion, for example, a polymer dispersant. It will be obvious for those skilled in the art that the dispersant and surfactant contained in the pigment dispersion also functions as a dispersant and surfactant for the ink composition.

Specific examples thereof include polymer dispersants such as polyacrylic acid, a polyacrylic acid-styrene copolymer, a polyester, a polyurethane, polyvinyl chloride, a polyvinyl chloride-vinyl acetate copolymer, vinyl chloride-modified polyacrylic acid, a polyoxyalkylene-added polyalkyleneamine and polyvinyl butyral, silicone-based surfactants such as polyester-modified polydimethylsiloxane and polyether-modified polydimethylsiloxane, acetylene diol-based surfactants, sorbitan-based surfactants and the like.

The light curable ink may contain an aqueous solvent. Further, as optional components, there may be added a resin emulsion, an inorganic oxide colloid, a wetting agent, a pH regulator, a pesticide, a biocide and the like.

Further, it is preferred that the ink light curable ink composition does not contain any organic solvent to be a non-solvent type ink composition.

EXAMPLES

The present invention will be illustrated in greater detail with reference to the following Examples, but the invention should not be construed as being limited thereto.

1. Preparation of Polymerizable Fine Particles 1A and Dispersion Thereof

To a 200-mL Erlenmeyer flask was added 88.1 parts by weight of a silica sol IPA-ST (an isopropyl alcohol (hereinafter abbreviated as "IPA") dispersion having a silica concentration of 30% by weight, manufactured by Nissan Chemical Industries, Ltd.), and then, 7.9 parts by weight of a silane coupling agent, Sila-Ace S710 (3-methacryloxypropyltrimethoxysilane, manufactured by Chisso Corp.) was added thereto. While stirring with a magnetic stirrer, 4 parts by weight of hydrochloric acid having a concentration of 0.05 mol/L was added, and the reaction was carried out with stirring at room temperature for 24 hours. As a result, IPA Dispersion A containing methacryl group-containing polymerizable fine particles 1A (MPS) was obtained.

To a 300-mL round-bottom flask were added 70 parts by weight of N-vinylformamide (hereinafter also referred to as "NVF", Beam Set 770, manufactured by Arakawa Chemical Industries, Ltd.) and 100 parts by weight of the above-mentioned dispersion A, and then, IPA was removed by evaporation using a rotary evaporator to obtain dispersion B containing polymerizable fine particles 1A in an amount of 30% by weight.

2. Preparation of Pigment Dispersions 2-1. (Yellow) Pigment Dispersion C

C. I. Pigment Yellow (P. Y.) 74 as a pigment that is a color material, a polyurethane resin (average molecular weight; about 20,000) (hereinafter also referred to as "dispersant"), and NVF were mixed at a ratio of pigment:dispersant:NVF=15:5:80 and dispersed in a sand mill (manufactured by Yasukawa Seisakusho) together with glass beads (diameter: 1.7 mm, 1.5 times the weight of the mixture) for 2 hours. Thereafter, the glass beads were separated to prepare pigment dispersion C (pigment concentration: 15% by weight).

2-2. (Magenta) Pigment Dispersion D

Pigment dispersion D (pigment concentration: 15% by weight) was prepared in the same manner as in the case of the above-mentioned pigment dispersion C with the exception that the pigment was changed to C. I. Pigment Red (P. R.) 122.

2-3. (Cyan) Pigment Dispersion E

Pigment dispersion E (pigment concentration: 15% by weight) was prepared in the same manner as in the case of the above-mentioned pigment dispersion C with the exception that the pigment was changed to C. I. Pigment Blue (P. B.) 15:3.

2-4. (Black) Pigment Dispersion F

Pigment dispersion F (pigment concentration: 15% by weight) was prepared in the same manner as in the case of the above-mentioned pigment dispersion C with the exception that the pigment was changed to C. I. Pigment Black (P. Bk.) 7.

3. Preparation of Ink Compositions 3-1. Yellow Pigment Ink Composition (Y)

To a vessel having light shielding properties were added 20 parts by weight of dispersion B and 10 parts by weight of pigment dispersion C, and then, 29 parts by weight of NVF, 25 parts by weight of tripropylene glycol diacrylate (hereinafter also referred to as "TPGDA", Aronix M-220, manufactured by Toagosei Co., Ltd.), 10 parts by weight of glycerin EO-modified triacrylate (hereinafter also referred to as "AGE3", HK Ester A-Gly-3E, manufactured by Shin-Nakamura Chemical Corp.), 4.0 parts by weight of Irgacure 819 (bis(2,4,6-trimethylbenzoyl)-phenylphosphine oxide, manufactured by Ciba Specialty Chemicals), 1.0 part by weight of Irgacure 369 (2-benzyl-2-dimethylamino-1-(4-morpholinophenyl)-butanone-1, manufactured by Ciba Specialty Chemicals) and 1 part by weight of Darocur EHA (2-ethylhexyl-4-dimethoxyaminobenzoate, manufactured by Ciba Specialty Chemicals) were added, followed by stirring and mixing with a magnetic stirrer for 1 hour. Then, the mixture was filtrated through a 5-m membrane filter under an environment shielded from ultraviolet rays to prepare a yellow ink composition having the following composition.

| | |
|---|---|
| NVF | 51 wt % |
| TPGDA | 25 wt % |
| AGE3 | 10 wt % |
| Dispersant | 0.5 wt % |
| Irgacure 819 | 4.0 wt % |
| Irgacure 369 | 1.0 wt % |

-continued

| | |
|---|---|
| Darocur EHA | 1.0 wt % |
| Polymerizable Fine Particles 1 | 6.0 wt % |
| C.I. Pigment Yellow 74 (color material) | 1.5 wt % |

3-2. Magenta, Cyan, Black Pigment Ink Compositions

Similarly hereinafter, respective ink compositions having the following composition were prepared using dispersion D, E and F, respectively, instead of dispersion C.

| Magenta Pigment Ink Composition (M) | |
|---|---|
| NVF | 51 wt % |
| TPGDA | 25 wt % |
| AGE3 | 10 wt % |
| Dispersant | 0.5 wt % |
| Irgacure 819 | 4.0 wt % |
| Irgacure 369 | 1.0 wt % |
| Darocur EHA | 1.0 wt % |
| Polymerizable Fine Particles 1 | 6.0 wt % |
| C.I. Pigment Red 122 (color material) | 1.5 wt % |
| **Cyan Pigment Ink Composition (C)** | |
| NVF | 51 wt % |
| TPGDA | 25 wt % |
| AGE3 | 10 wt % |
| Dispersant | 0.5 wt % |
| Irgacure 819 | 4.0 wt % |
| Irgacure 369 | 1.0 wt % |
| Darocur EHA | 1.0 wt % |
| Polymerizable Fine Particles 1 | 6.0 wt % |
| C.I. Pigment Blue 15:3 (color material) | 1.5 wt % |
| **Black Pigment Ink Composition (K)** | |
| NVF | 51 wt % |
| TPGDA | 25 wt % |
| AGE3 | 10 wt % |
| Dispersant | 0.5 wt % |
| Irgacure 819 | 4.0 wt % |
| Irgacure 369 | 1.0 wt % |
| Darocur EHA | 1.0 wt % |
| Polymerizable Fine Particles 1 | 6.0 wt % |
| C.I. Pigment Black 7 (color material) | 1.5 wt % |

[Curing Test]

Each of the above-mentioned ink compositions was dropped on a glass substrate in an amount of about 0.05 μL, and a curing test was carried out. The ultraviolet irradiation was performed by combining the following two irradiating apparatuses. After curing treatment was carried out under curing conditions of an irradiating time of 15 seconds, curability was visually evaluated. As a result, it was confirmed that all of the four color ink compositions were well cured.

Irradiating Apparatus 1:

Light source: Ultraviolet LD NDHU110APAE2 (manufactured by Nichia Corp.)

Peak Wavelength: 370 to 380 nm

Rated Output: 10 mW

Irradiating Apparatus 2:

Light source: LD NDHU110APAE2 (manufactured by Nichia Corp.)

Peak Wavelength: 400 to 415 nm

Rated Output: 60 mW

While the present invention has been described in detail and with reference to specific embodiments thereof, it will be apparent to one skilled in the art that various changes and modifications can be made therein without departing from the spirit and scope thereof.

This application is based on Japanese Patent Application Nos. 2005-200301 (filed Jul. 8, 2005) and 2006-058695 (filed Mar. 3, 2006), and the contents thereof are herein incorporated by reference.

What is claimed is:

1. A light irradiating apparatus comprising a plurality of light emitting elements which emit light of a specific wavelength region and form elliptical light images on a surface to be irradiated, wherein the plurality of light emitting elements are mutually arranged in a plurality of parallel lines with a light image formed by a light emitting element in one of the plurality of lines being continuous with an adjacent light image formed by a light emitting element in another of the plurality of lines such that the continuous light images are alternately disposed in a staggered arrangement on the surface.

2. The light irradiating apparatus according to claim 1, wherein the plurality of light emitting elements comprise a single species or a combination of plural species of light emitting elements which emit an ultraviolet ray or visible light.

3. The light irradiating apparatus according to claim 1, wherein an arrangement of the plurality of light emitting elements is formed by arranging light emitting elements having the same light emitting wavelength peak or light emitting elements different in the light emitting wavelength peak, with spacing from one another along major axis directions of the elliptical light images.

4. The light irradiating apparatus according to claim 1, wherein the axis aspect ratio of the light image is 2.0 or more.

5. The light irradiating apparatus according to claim 1, wherein the light emitting elements comprise a semiconductor laser element.

6. The light irradiating apparatus according to claim 5, wherein the semiconductor laser element is one which emits an ultraviolet ray having a wavelength of less than 400 nm.

7. The light irradiating apparatus according to claim 5, wherein the semiconductor laser element is one which emits visible light having a wavelength of 400 to 450 nm.

8. The light irradiating apparatus according to claim 5, wherein the semiconductor laser element is a combination of one which emits an ultraviolet ray having a wavelength of less than 400 nm and one which emits visible light having a wavelength of 400 to 450 nm.

9. The light irradiating apparatus according to claim 1, further comprising an article comprising the surface to be irradiated.

10. The light irradiating apparatus according to claim 9, wherein the article is print paper.

11. The light irradiating apparatus according to claim 1, wherein the plurality of light emitting elements are alternately disposed in two a plurality of parallel lines such that the elliptical light images formed by the plurality of light emitting elements on the surface are arranged with a first set of elliptical light images being disposed in a first line and a second set of elliptical light images being disposed in a second line that is parallel to the first line, with each of the light images in the first set being adjacent a light image in the second set and with adjacent light images being continuous.

12. The light irradiating apparatus according to claim 11, wherein the apparatus further comprises a plate shaped structural member on which the plurality of light emitting elements are disposed along major axis directions of the light images and means for feeding the surface to be irradiated to a disposition wherein the plate shaped structural member and the surface to be irradiated are disposed in parallel.

13. A light irradiating process comprising (a) providing a light irradiating apparatus comprising a plurality of light emitting elements which emit light of a specific wavelength region and form elliptical light images on a surface to be irradiated, wherein the plurality of light emitting elements are mutually arranged in a plurality of parallel lines with a light image formed by a light emitting element in one of the plurality of lines being continuous with an adjacent light image formed by a light emitting element in another of the plurality of lines such that the continuous light images are alternately disposed in a staggered arrangement on the surface; and (b) causing the plurality of light emitting elements to emit light of the specific wavelength region to form elliptical light images on the surface to be irradiated, wherein the light image are alternately disposed in a staggered arrangement on the surface.

14. The light irradiating process according to claim 13, wherein the light emitting elements are allowed to achieve continuous wave light emission.

15. The light irradiating process according to claim 13, wherein the light emitting elements are allowed to achieve pulse light emission.

16. The light irradiating process according to claim 13, wherein the surface is a recording medium and the process further comprises adhering a light curing type ink composition onto the recording medium prior to step (b), and then causing the plurality of light emitting elements to emit light onto the recording medium.

17. The light irradiating process according to claim 16, wherein the light curing type ink composition is one which contains at least a polymerizable compound, a photopolymerization initiator and a polymerization accelerator, and contains an N-vinyl compound as the polymerizable compound, two or more selected from the group consisting of a bisacylphosphine oxide, a monoacylphosphine oxide and an α-aminoketone as the photopolymerization initiator, and polymerizable functional group-containing fine particles as the polymerization accelerator, respectively.

18. The light irradiating process according to claim 13, wherein the light irradiating apparatus provided in step (a) further comprises a plate shaped structural member on which the plurality of light emitting elements are disposed and means for feeding the surface to be irradiated to a disposition wherein the plate shaped structural member and the surface to be irradiated are disposed in parallel.

* * * * *